United States Patent [19]

Gay

[11] 3,958,015

[45] May 18, 1976

[54] PURIFIED PLANT PROTEIN CONCENTRATE

[76] Inventor: Max M. Gay, 24, rue de Bruxelles a 67/, Strasbourg (Bas-Rhin), France

[22] Filed: June 20, 1975

[21] Appl. No.: 588,720

Related U.S. Application Data

[63] Continuation-in-part of Ser. No. 315,229, Dec. 14, 1972, abandoned.

[30] Foreign Application Priority Data

Dec. 14, 1971 France ............................. 71.46033

[52] U.S. Cl. .................................... 426/18; 195/5; 426/44; 426/46; 426/50; 426/52; 426/53; 426/656

[51] Int. Cl.² .................. A23J 1/12; A23J 1/14; A23J 3/00; A23K 1/14

[58] Field of Search ................ 426/656, 18, 46, 50, 426/52, 53, 44; 195/5

[56] References Cited
UNITED STATES PATENTS

| | | | |
|---|---|---|---|
| 3,157,513 | 11/1964 | Allen et al. | 426/18 |
| 3,640,725 | 2/1972 | Sherga et al. | 426/44 X |
| 3,694,221 | 9/1972 | Hoer et al. | 426/46 |
| 3,782,964 | 1/1974 | Knight | 195/4 X |
| 3,803,329 | 4/1974 | Valentas et al. | 426/44 |

OTHER PUBLICATIONS

Schierbaum et al., Monatsschrift für Brauerei, Vol. 21, pp. 324–328 (Nov., 1968).
Nordheim et al., Monatsschrift fur Brauerei, Vol. 21, pp. 358–363 (Dec., 1968).

*Primary Examiner*—James R. Hoffman
*Attorney, Agent, or Firm*—Robert E. Burns; Emmanuel J. Lobato; Bruce L. Adams

[57] ABSTRACT

A process for treating plant materials to obtain a augmented high protein and low carbohydrate product wherein plant materials of high starch content are treated with enzymes which modify the carbohydrates contained therein, to a form assimilable by yeasts and the assimilable carbohydrates are then metabolized by alimentary yeasts to enrich the protein content over that of the starting material.

10 Claims, No Drawings

PURIFIED PLANT PROTEIN CONCENTRATE

This application is a continuation in part of my prior copending application Ser. No. 315,229 filed on Dec. 14, 1972 and entitled "Purified soya concentrate" and now abandoned.

BACKGROUND OF THE INVENTION

Availability throughout the world of proteins of animal origin is not sufficient to cover needs. Almost one-third of the world's population suffers from malnutrition due to protein deficiency. For under-developed regions it is estimated that in the year 2000, proteins will have to be available in quantities from 4 to 7 times greater than those required in 1968.

The quantitative problem is doubled by an economic problem: it is necessary to have sufficient, available protein at very low cost.

The soya bean, which can be cultivated and produced intensively, fulfils the desired quantitative and economic criteria. The soya bean, or soya, is rich in protein of well balanced amino acids composition, with the exception of a slight deficiency in methionine which can be corrected easily and cheaply. Its lysine content (approximately 6g per 16g nitrogen) is the highest in the vegetable kingdom. Soya contains almost as much lysine as eggs.

The use of soya, from which the oil has been removed, as a source of protein for feeding animals has undergone considerable development in the last 20 years. More than 5 million tons of soya cake per year are now used in Common Market countries.

For feeding humans, various protein concentrates have been extracted from soya, most frequently at a high cost (texturised protein for example).

The contribution which soya has to make in economically reducing protein deficiency throughout the world still remains to be perfected.

Whole raw soya or soya from which the oil has been removed is poorly tolerated by the human system; it causes insufficient growth and serious physiological disorders.

Soya contains various known and unknown factors, which prevent its assimilation by the digestive system, e.g. anti-enzymatic substances (anti-trypsin, anti-alpha-chymotrypsin.

Industrial treatments, particularly of the thermal type, make it possible to improve the nutritional quality of the soya by deactivating certain of these enzyme inhibitors (Annales de Zootechnie Vo.20 no. 1, 1971, Pages 11 to 89). This heated (toasted) soya incorporated in food for animals, after their weaning, no longer has the nutritional deficiencies of raw soya.

However, this soya thermally treated with a view to reducing its anti-proteasic activity, even if it ensures satisfactory growth without physiological disorders in the adolescent and adult human and animal system, does not ensure this in the young person or animal, above all at the ante-natal period.

The high cost of milk (particularly for suckling young ruminants), its declining production which will become rapidly deficient and the intolerance shown for it by many children are all inducements to search for a means to purify soya and make it acceptable for providing the protein requirements of young children and young animals in place of natural milk.

It has now been established that apart from proteasic inhibitors, the presence in soya of certain carbohydrates, particularly oligosaccharides (stachyose, raffinose, etc.), is responsible for digestive disorders (flatulance, diarrhoea, etc.) and for the imperfect assimilation of the soya proteins in young children and young animals, even when the soya has undergone heat treatment. These carbohydrates are mostly insoluble in water (less than 1 % are water soluble).

Oil-free purified soya concentrates have been produced on an industrial scale for several years and their carbohydrate content has been greatly reduced by the solvent action of an alcohol in a heated state. These products have been widely tested on infants and young calves; they have the required nutritional qualities without causing any of the digestive disorders aforedescribed (PROMOSOY, manufactured by Central Soya Inc., Decatur, Ill., U.S.A.). The effects of the action of certain enzymes on oligosaccharides such as are found in the seeds of leguminuous plants and in certain tubers are well known inter alia from the works of H. SUZUKI, Y. OZAWA and O. TANABE.

1963 "Decomposition of raffinose by a-galactosidase of Actinomycetes". 1. Isolation and selection of strain. Nippon Nogei Kagaku Kaishi 37 : 673–679 ;

1964 "Decomposition of raffinose in beet molasses by a-galactosidase". Hakko Kyokaishi 22 : 455–459 ;

1966 "Studies on the decomposition of raffinose by a-galactosidase of Actinomycetes". IV. Characteristics of a-galactosidase and estimation of raffinose by the enzyme preparation. Agr. Biol.Chem.30 : 1039–1046.

U.S. Pat. No. 725,497 filed on Apr. 30th, 1968, now U.S. Pat. No. 3,632,346 by ROHM and HAAS Company consists of a process which makes it possible to decompose the oligosaccharides, present in certain foods which product flatulance by an enzymatic action, the principle of which has been described by the aforementioned authors. In this process, the sugars obtained after enzymatic degradation are not extracted and also the initial protein content of the soya is not increased.

A cattle food based on soya also exists which until now has been available on an experimental scale. The animal tolerance of this product is improved due to the decomposition of undigested carbohydrates by the enzymatic action on the soya of pectinases alone or associated with cellulases or hemicellulases. In this food, the sugars obtained after enzymatic degradation are not extracted and the initial protein content of the soya is not increased (Patent Application No. P1792142.5 of July 26th, 1968 in the German Federal Republic by ROHM/HAAS GmbH).

Soya bean is one of the richest vegetable products cultivated on this planet. Other vegetables exist, the seeds or roots of which have a less well balanced composition : they provide little protein and plenty of carbohydrates, especially in the form of starch.

In the family of leguminous plants large quantities of grain are used for human and animal feeding, such as broad beans, haricot beans, peas, lentils, etc. . .

In the family of the graminaceae, cereals such as wheat, rice, maize are used in considerable quantities.

In the family of the solanaceae the tuber of Solanum tuberosum, the potato, is universally consumed.

In the family of the euphorbiaceae, cassava (Manihot esculenta) provides a root which gives manioc or tapioca, a basic foodstuff of the countries of Africa, South America, etc...

Patents and publications referring to grain from leguminous plants, to cereals, to the potato, to manioc, describe methods of transformation of the carbohydrates, among them starch, by the action of various enzymes (examples : U.S. Pat. No. 3,782,964/1.1.74 — Method of upgrading starch-containing crude gluten; U.S. Pat. No. 3,157,513/17.11.1964 — Enzymatic treatment of cereal grains, Article by M. A. BUFFA which appeared in the "Revue des Industries Alimentaires et Agricoles"—Le Traitement exzymatique des farine de sevrage, 1968, II, p. 1477 describing enzymatic processing of flour from cereals and leguminous plants). The patents and publications, however, do not describe the elimination of the carbohydrates transformed by the action of the enzymes.

SUMMARY OF THE INVENTION

The object of the present invention is to transform by a metabolization process using alimentary yeasts, a considerable fraction of the carbohydrates of soya and/or other plant material containing both proteins and carbohydrates, whether they are considered digestible or indigestible, subsequent to an enzyme treatment using one or more enzymes, whose action, namely that of hydrolysing and modifying such carbohydrates from the slant material in such a manner that those hydrolysed and modified carbohydrates are then metabolized by yeasts, is specific to all the carbohydrates such as cellulases, hemicellulases, pectinases, amylases, betaglucanases, invertases, in order to obtain a product low in carbohydrates and whose proportion of protein is greater than that of the original soya and/or other plant material.

The invention then relates to a method of amplifying soya and/or other plant material and increasing the initial protein content characterised in that there is extracted from the soya and/or from other plant material, by metabolization by means of yeasts, a considerable fraction of the transformed carbohydrates, in order to increase the protein content of the final product with respect to the original soya and/or other plant material.

These products, enriched in proteins, have an improved nutritional value. Their new balance proceeding from increase in the protein/calory ratio can effectively contribute to resolving the problem of the world deficit in proteins which is becoming more marked in the demographic context of the next decades.

The method which forms the object of the present invention is economical because it employs industrial enzymes having a specific action and food yeasts of very rapid, growth, and thus enables the processing time to be minimized and relatively simple material to be employed.

DETAILED DESCRIPTION OF THE INVENTION

The invention will be better understood with reference to the following description and to the seven non-limiting examples.

The principle of the present invention is as follows:
1. The partially or totally deoiled soya bean and/or other plant material like legume beans (field beans, broad beans, white beans, peas, etc..) cereals (wheat, corn, rice etc..), roots and tubers (potatoes, manioc), and which has or has not been thermally treated, dehulled, peeled, ground or crushed, or flattened, are subjected to the simultaneous action of enzymes The action of the enzymes like amylases, pectinase, cellulases, invertases, beta-glucanases is specific to all the carbohydrates. The enzymatic action takes place in an aqueous medium at suitable pH, temperatures, agitation for an appropriate period of time.

2. The aqueous suspension of soya and/or other plants material is heated for a short period of time to deactivate the enzymes.

3. The aqueous suspension of soya and/or other plant material is subjected to fermentation by an alimentary yeast at suitable pH, temperature, air, nitrogen supply for an appropriate period of time.

4. The yeast-fermented suspension is then pasturized and 5. the pasteurized suspension is dried by any appropriate means.

EXAMPLE 1

A a. 100 grams of fine soya flour from which the oil has been removed and which is toasted and placed in suspension in 400 grams of pure water heated to a temperature of 45°C. The pH of this suspension is adjusted to 5,2 by the addition of sulphuric acid.

b. 150 milligrams of a commercial pectinase are added to this suspension measuring: polygalacturonase having a PG activity of 800 units/gram pectinmethylesterase having a PG activity/gram of 20 units, a considerable uncalculated activity of pectintranselminase and a hemicellulasic activity of 11,400 units of CMC/activity (Cx) gram. 50 milligrams of an invertase having an inversion power of 560 PI are also added.

c. The soya suspension is stirred continuously at a constant temperature of 45°C for 5 hours.

d. The soya suspension is brought to a temperature of 70°C, with constant stirring, for 30 minutes in order to deactivate the enzymes.

e. 20 grams of a 20% suspension of bakers yeast, saccharomyces cerevesiae are added to the soya suspension heated to 30°C.

f. For 6 hours the fermenting liquor is stirred continuously and nitrogen is added in the form of 200 milligrams of ammonium phosphate.

g. The suspension of soya and yeast is pasteurized.

h. The suspension of soya and yeast is concentrated by evaporation in vacuo and dried by atomisation in a spray tower.

At the beginning of the operation the soya flour has 50% dry weight raw protein and 0,80% reducing sugars. After the stage (c) of treatment with enzymes, the proportion of reducing sugars reaches 15 %.

After the final drying stage (h) the proportion of raw proteins in the dry concentrate reaches 60%. Reducing sugars are less than 1%.

EXAMPLE 2

B a. 100 grams of fine flour of dehulled field beans (Vicia faba minor) are placed in suspension in 200 grams of pure water heated to a temperature of 70°C. The pH of this suspension is brought to 6.5 by the addition of sulphuric acid.

b. 150 milligrams of a commercial alpha-amylase measuring 100.000 units PS 40 are added to this suspension. The temperature is increased progressively (1°C/minute) until 95°C. This suspension is stirred during 30 minutes and kept at a temperature of 95°C.
c. 100 grams of cold pure water are added to the suspension. Temperature is lowered to 52°C. The pH of this suspension is adjusted to 5.2. by the addition of sulphuric acid.
d. 150 milligrams of a commercial amyloglucidase, measuring 200 units AG, are added to the suspension. 150 milligrams of a commercial invertase having an inversion power of 560 PI are also added.
e. The suspension is stirred continuously at a constant temperature of 52° C for 6 hours.
f. The suspension is brought to a temperature of 80°C for 20 minutes in order to deactivate the enzymes.
g. 20 grams of a 20% dry-matter suspension of brewers yeast, Saccharomyces carlsbergensis, are added to the suspension kept under a constant temperature of 28°C.
h. For 6 hours the fermenting liquor is stirred continuously. Nitrogen is added in the form of 200 milligrams of ammonium phosphate. Sterile air is added at a rate of 5 liters/hour.
i. The suspension of field beans and yeast is pasteurized.
j. The suspension is concentrated by evaporation in vacuo and dried by atomisation in a spray tower.

At the beginning of the operation, the dehulled field bean flour has 35% dry weight raw protein, 0,4% reducing sugars, 49% starch.

After the stage (f) the proportion of reducing sugars reaches 42 %.

After the stage (j) the proportion of raw proteins in the dry concentrate reaches 56%. Reducing sugars are less than 1%.

EXAMPLE 3 a. 100 grams of fine flour of dehulled small white beans (Phaseolus vulgaris) is placed in suspension in 300 grams of pure water heated to a temperature of 70°C. The pH of this suspension is brought to 6.5. by the addition of sulphuric acid.
b. 150 milligrams of a commercial alpha-amylase measuring 100.000 Units PS 40, are added to this suspension. The temperature is increased progressively (1°C/minute) until 95°C. This suspension is stirred during 30 minutes and kept at a temperature of 95°C.
c. 100 grams of cold pure water are added to the suspension. Temperature is lowered tto 52°C. The pH of this suspension is adjusted to 5.2 by the addition of sulphuric acid.
d. 150 milligrams of a commercial beta-glucanase measuring 80% betaglucanase activity are added to the suspension. 150 milligrams of a amyloglucosidase measuring 200 Units AG, are also added. 150 milligrams of a commercial invertase having an inversion power of 560 PI are also added.
e. The suspension is stirred continuously at a constant temperature of 52°C for 6 hours.
f. The suspension is brought to a temperature of 80°C for 20 minutes in order to deactivate the enzymes.
g. 20 grams of a 20% dry-matter suspension of brewers yeast, Saccharomyces carlsbergensis, are added to the suspension kept under a constant temperature of 28°C.
h. For 6 hours the fermenting liquor is stirred continuously. Nitrogen is added in the form of 200 milligrams of ammonium phosphate. Sterile air is added at a rate of 5 liter/hour.
i. The suspension of white beans and yeast is pasteurized.
j. The suspension is concentrated by evaporation in vacuo and dried by atomisation in a spray tower.

At the beginning of the operation, the dehulled small white bean flour has 27% dry weight raw protein, 0,38% reducing sugars, 38% starch.

After the stage (f) the proportion of reducing sugars reaches 34%.

After the stage (j) the proportion of raw proteins in the dry concentrate reaches 44 %. Reducing sugars are less than 1%.

EXAMPLE 4 a. 100 grams of fine flour of dehulled chick-peas (Cicer arietinum) is placed in suspension in 300 grams of pure water heated to a temperature of 70° C. The pH of this suspension is brought to 6.5 by the addition of sulphuric acid.
b. 150 milligrams of a commercial alpha-amylase measuring 100.000 Units PS40, are added to this suspension. The temperature is increased progressively (1°C/minute) until 95°C. This suspension is stirred during 30 minutes and kept at a temperature of 95°C.
c. 100 grams of cold pure water are added to the suspension. Temperature is lowered to 52°C. The pH of this suspension is adjusted to 5.2 by the addition of sulphuric acid.
d. 150 milligrams of a commercial amyloglucosidase, measuring 200 Units AG, are added to the suspension. 150 milligrams of a commercial invertase having an inversion power of 560 PI are also added. 150 milligrams of a commercial beta-glucanase measuring 80% beta-glucanase activity are also added.
e. The suspension is stirred continuously at a constant temperature of 52°C for six hours.
f. The suspension is brought to a temperature of 80°C for 20 minutes in order to deactivate the enzymes.
g. 20 grams of a 20% dry-matter suspension of brewers yeast, Saccharomyces carlsbergensis, are added to the suspension kept under a constant temperature of 28°C.
h. For 6 hours the fermenting liquor is stirred continuously. Nitrogen is added in the form of 200 milligrams of ammonium phosphate. Sterile air is added at a rate of 5 liters/hour.
i. The suspension of chick peas and yeast is pasteurized.
j. The suspension is concentrated by evaporation in vacuo and dried by atomisation in a spray tower.

At the beginning of the operation, the dehulled chick-peas flour has 22% dry weight raw protein, 0,5% reducing sugars, 55 % starch.

After the stage (f) the proportion of reducing sugars reaches 48 %.

After the stage (j) the proportion of raw proteins in the dry concentrate reaches 46 %. Reducing sugars are less than 1 %.

EXAMPLE 5 a. 100 grams of whole corn meal of maize (Zea mays) is placed in suspension in 200 grams of pure water heated to a temperature of 70°C. The pH of this suspension is brought to 6.5 by the addition of sulphuric acid.

b. 150 milligrams of a commercial alpha-amylase measuring 100.000 Units PS40 are added to this suspension. The temperature is increased progressively (1°C/minute) until 95°C. This suspension is stirred during 30 minutes and kept at a temperature of 95°C.
c. 100 grams of cold pure water are added to the suspension. Temperature is lowered to 52°C. The pH of this suspension is adjusted to 5.2 by the addition of sulphuric acid.
d. 150 milligrams of a commercial amyloglucosidase measuring 200 Units AG, are added to the suspension. 150 milligrams of a commercial invertase having an inversion power of 560 PI are also added.
e. The suspension is stirred continuously at a constant temperature of 52°C for 6 hours.
f. The suspension is brought to a temperature of 80°C for 20 minutes in order to deactivate the enzymes.
g. 20 grams of a 20% suspension of a yeast, Saccharomyces florentinus, are added to the maize suspension kept under a constant temperature of 28°C.
h. For 6 hours the fermenting liquor is stirred continuously. Nitrogen is added in the form of 200 milligrams of ammonium phosphate. Sterile air is added at a rate of 5 liters/hour.
i. The suspension of maize and yeast is pasteurized.
j. The suspension is concentraded by evaporation in vacuo and dried by atomisation in a spray tower.

At the beginning of the operation the maize meal has 9,5% dry weight raw protein, 0,4% reducing sugars, 100% starch.

After the stage (f) the proportion of reducing sugars reaches 50%.

After the stage (j) the proportion of raw proteins in the dry concentrate reaches 35%. Reducing sugars are less than 1%.

EXAMPLE 6 a. 400 grams of peeled potatoes (Solanum tuberosum) are crushed in order to obtain a homogenous mash. The mash is heated to a temperature of 70°C. The pH is adjusted to 6,5 by addition of ascorbic acid which also avoids browning.
b. 150 milligrams of a commercial alpha-amylase measuring 100.000 Units PS40 are added to this suspension. The temperature is increased progressively (1°C/minute) until 95°C. This suspension is stirred during 30 minutes and kept at a temperature of 95°C.
c. 200 grams of cold pure water are added to the suspension. Temperature is lowered to 52°C. The pH of this suspension is adjusted to 5.2 by the addition of sulphuric acid.
d. 150 milligrams of a commercial amyloglucosidase, measuring 200 Units AG, are added to the suspension. 150 milligrams of a commercial invertase having an inversion power of 560 PI are also added.
e. The suspension is stirred continuously at a constant temperature of 52°C for 6 hours.
f. The suspension is brought to a temperature of 80°C for 20 minutes in order to deactivate the enzymes.
g. 30 grams of a 20% dry-matter suspension of brewers yeast, Saccharomyces carlsbergensis, are added to the suspension kept under a constant temperature of 28°C.
h. For 6 hours the fermenting liquor is stirred continuously. Nitrogen is added in the form of 300 milligrams of ammonium phosphate. Sterile air is added at a rate of 5 liters/hour.
i. The suspension of potatoes and yeast is pasteurized.
j. The suspension is concentrated by evaporation in vacuo and dried by atomisation in a spray tower.

At the beginning of the operation the potatoes have 8,75% dry weight raw protein, 0,90% reducing sugars, 65% starch.

After the stage (f) the proportion of reducing sugars reaches 61%.

AFter the stage (j) the proportion of raw proteins in the dry concentrate reaches 38%, reducing sugars are less than 1%.

EXAMPLE 7 a. 100 grams of tapioca meal (Manihot esculenta) is placed in suspension in 200 grams of pure water heated to a temperature of 70°C. The pH of this suspension is brought to 6.5 by the addition of sulphuric acid.
b. 150 milligrams of a commercial alpha-amylase measuring 100.000 Units PS 40 are added to this suspension. The temperature is increased progressively (1°C/minute) until 95°C. This suspension is stirred during 30 minutes and kept at a temperature of 95°C.
c. 100 grams of cold pure water are added to the suspension. Temperature is lowered to 52°C. The pH of this suspension is adjusted to 5.2 by the addition of sulphuric acid.
d. 150 milligrams of a commercial amyloglucidase, measuring 200 Units AG, are added to the suspension. 150 milligrams of a commercial invertase having an inversion power of 560 PI are also added.
e. The suspension is stirred continuously at a constant temperature of 52°C for 6 hours.
f. The suspension is brought to a temperature of 80°C for 20 minutes in order to deactivate the enzymes.
g. 20 grams of a 20% dry-matter suspension of brewers yeast, Saccharomyces carlsbergensis, are added to the suspension kept under a constant temperature of 28°C.
h. For 6 hours the fermenting liquor is stirred continuously. Nitrogen is added in the form of 200 milligrams of ammonium phosphate. Sterile air is added at a rate of 5 liters/hour.
i. The suspension of tapioca and yeast is pasteurized.
j. The suspension is concentrated by evaporation in vacuo and dried by atomisation in a spray tower.

At the beginning of the operation, the tapioca meal has 2% dry weight raw protein, 0,2% reducing sugars, 71% starch.

After the stage (f) the proportion of reducing sugars reaches 62%.

After the stage (j) the proportion of raw proteins in the dry concentrate reaches 36%. Reducing sugars are less than 1%.

What is claimed is:

1. A process for treating plant material containing both proteins and carbohydrates to obtain a food product intended for humans or animals and which has a higher protein content and a lower carbohydrate content than the starting plant material, which comprises the steps of macerating a liquid aqueous suspension of sub-divided plant material with enzymes acting preferentially on the carbohydrates of the said plant material for a time sufficient to modify the carbohydrates contained therein, in such a manner that these modified carbohydrates are able to be metabolized by alimentary yeasts, and then further macerating said suspension with such yeasts (fam. Saccharomycetaceae) which metabolize said modified carbohydrates for a sufficient time to metabolize the same, the products of said metabolism enriching the protein content of the plant material.

2. The process according to claim 1, wherein the sub-divided plant material containing both proteins and carbohydrates is subjected, prior to said enzymatic action, to heat.

3. The process according to claim 2 wherein the plant material is soya bean.

4. Process according to claim 1, wherein the enzymes acting preferentially on the carbohydrates include at least one enzyme selected from the group consisting of amylases, cellulases, pectinases, invertases and beta-glucanases.

5. The process according to claim 1 which comprises
a. suspending 1,000 parts of toasted deoiled fine soya meal in 4,000 parts of pure water at about 40°–45°C;
b. adjusting the pH of the suspension in the range 4.3 – 5.2;
c. adding to the heated suspension 1.5 parts of a pectanase preparation measuring about 800 units/gm PG activity of polygalacturonase, 20 units/gm PG activity of pectin-methylesterase, a considerable activity of pectin-transelminase, and 11400 units/gm CMC activity (Cx) of hemicellulase; together with 0.5 parts of invertase having an inversion power of 560 IP;
d. macerating the suspension with continued agitation for 3 hours until the carbohydrates of the suspension are modified to reducing sugars assimilable by yeasts;
e. inactivating the enzymes by inceasing the temperature to about 70°C until said enzymes are inactivated;
f. reducing the temperature of the enzyme-inactivated mixture to 30°C and adding 4000 parts of a 1% suspension of Saccharomyces Cerevisiae (brewer's yeast) to initiate fermentation;
g. maintaining the yeast fermentation with continuous agitation for about 6 hrs until said reducing sugars are substantially eliminated while continuously adding nitrogen as about 2 parts of ammonium phosphate;
h. pasteurizing the yeast-fermented suspension;
i. concentrating the pasteurized suspension by evaporation under vacuum; and then;
k. drying the concentrate by spray drying.

6. The process according to claim 1, which comprises
a. suspending 1,000 parts of a fine flour of dehulled field beans (vicia fava minor) in 4,000 parts of pure water at about 40° – 45°C:
b. adjusting the pH of the suspension in the range 4.3 – 6.5;
c. adding to the heated suspension 1.5 parts of a commercial alpha-amylase measuring 100,000 units PS 40 raising the temperature of the suspension to about 95°C at which temperature of the suspension is stirring for 30 minutes and then the suspension is cooled by adding 1,000 parts of cold water and further cooled to about 52°C and adding to the cooled suspension 1.5 parts of a commercial amyloglucidase measuring 200 units AG together with 1.5 parts of a commercial invertase having an inversion power of 560 PI:
d. macerating, the suspension with continued agitation, until the carbohydrates of the suspension are modified to reducing sugars metabolizable by yeasts;
e. inactivating the enzymes by heating to a temperature of at least 70°C until said enzymes are inactivated;
f. reducing the temperature of the enzyme-inactivated mixture to 30°C and adding 200 parts of a 20% dry matter suspension of Brewer's Yeast, (Saccharomyces Carlsbergensis);
g, maintaining the yeast fermentation with continuous agitation at a temperature in the range 28° – 35°C until substantially all the reducing sugars are metabolized, while continuously adding nitrogen as 2 parts of ammonium phosphate;
h. pasteurizing the yeast fermented suspension;
i. concentrating the pasteurized suspension by evaporation under vacuum; and then
k. drying the concentrated suspension.

7. The food product resulting from the process according to claim 1.

8. The protein food product, prepared by the concentration of the product resulting from the process according to claim 1.

9. The process according to claim 1, wherein said plant material containing both proteins and carbohydrates is selected from the group consisting of seeds, legumes, grains and cereals, and roots and tubers of high starch content and mixtures thereof.

10. The process according to claim 9 wherein said legumes are selected from the group consisting of soya beans, field beans, broad beans, white beans, peas, chick peas, haricot beans, and lentiles; said grains and cereals are selected from the group consisting of wheat, rice and corn; and said roots and tubers are selected from the group consisting of potatoes and cassava.

* * * * *